(12) United States Patent
Goble

(10) Patent No.: US 6,487,157 B2
(45) Date of Patent: *Nov. 26, 2002

(54) DISK DRIVE ENCLOSURE WITH DISK HOLDERS

(75) Inventor: Greg Goble, Lake Forest, CA (US)

(73) Assignee: Mitsumi Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/334,505

(22) Filed: Jun. 21, 1999

(65) Prior Publication Data

US 2002/0018423 A1 Feb. 14, 2002

(51) Int. Cl.[7] .................. G11B 33/02; B65D 85/30; B65D 85/57; B65D 85/575
(52) U.S. Cl. ........................... 369/75.1; 206/307
(58) Field of Search ............... 369/75.1, 75.2, 369/77.1, 77.2; 206/307, 307.1, 308.1, 308.2, 308.3, 309, 310, 311, 312, 313

(56) References Cited

U.S. PATENT DOCUMENTS

| 1,334,374 | A | * | 3/1920 | Howard ................. 312/8.11 |
| 1,843,529 | A | * | 2/1932 | Weiland ................. 369/75.1 |
| 5,346,074 | A | * | 9/1994 | Overholser ............... 211/40 |
| 5,632,374 | A | * | 5/1997 | Fitzsommons et al. .. 206/308.1 |
| 5,762,246 | A | * | 6/1998 | Drew ..................... 224/312 |
| 5,996,786 | A | * | 12/1999 | McGrath ............... 206/308.1 |

FOREIGN PATENT DOCUMENTS

FR 2698475 A * 5/1994

* cited by examiner

Primary Examiner—Hoa T. Nguyen
Assistant Examiner—Julie Anne Watko
(74) Attorney, Agent, or Firm—Knobbe, Martens, Olson & Bear, LLP

(57) ABSTRACT

A disk drive enclosure is provided with a disk holder. The disk holder for holding disk products is provided on the top panel as an integral part of the enclosure, and has a shape for receiving and fitting thereto a side of each disk product. The shapes include grooves, slots, continuous ridges, discontinuous ridges, and a plurality of projections.

32 Claims, 3 Drawing Sheets

DISK DRIVE ENCLOSURE WITH DISK HOLDERS

BACKGROUND OF THE INVENTION

1. Field of the Invention

The present invention relates to a disk drive enclosure, and in particular, to a disk drive enclosure with a disk holder.

2. Description of the Related Art

Conventionally, disks to be used in a disk drive are stored in a separate disk holder. However, using a separate disk holder is inconvenient if a small number of disks are used mostly, especially when the disk holder is not placed in the vicinity of the disk drive enclosure.

SUMMARY OF THE INVENTION

One embodiment of the present invention is to provide a disk drive enclosure with a disk holder provided as an integral part of the enclosure. Thus, for example, one embodiment of the present invention includes a disk drive enclosure comprising a top panel and a disk holder for holding disk products. One aspect of the present invention is a disk holder provided on the top panel as an integral part of the enclosure. The disk holder has a shape for receiving and fitting thereto a side of each disk product. Thus, in one embodiment, a user who uses a disk drive (e.g., an optical disk drive) can handle disk products easily and efficiently, without using a separate disk holder.

The disk holder may be constituted by grooves, slots, continuous ridges, discontinuous ridges, and/or a plurality of projections. The direction of holding disk products can be parallel to the front panel, parallel to the side panels, or offset, depending on the target user's preference. The offset direction may be such that the proximal end of the disk product is directed toward the right (or the left) of a user who is right-handed (or left-handed). The disk products can be held vertically on the top panel or slanted toward the user in view of ease of handling disk products. The disk product can be a disk itself, a hard case thereof, and a soft case thereof.

DETAILED DESCRIPTION OF A PREFERRED EMBODIMENT

The present invention relates to a disk drive enclosure, and in particular, to a disk drive enclosure with a disk holder.

The disk drive enclosure may be an enclosure for any disk drive such as an optical disk drive and floppy disk drive. The enclosure may be named a housing, a case, or a box. The enclosure comprises at least a top panel, and normally but not necessarily, further comprises a bottom panel, side panels, a front panel, and a rear panel. Located in the enclosure is a drive. Depending on the intended use of the drive, the enclosure may not have a bottom panel, of side panels.

Figure 1:
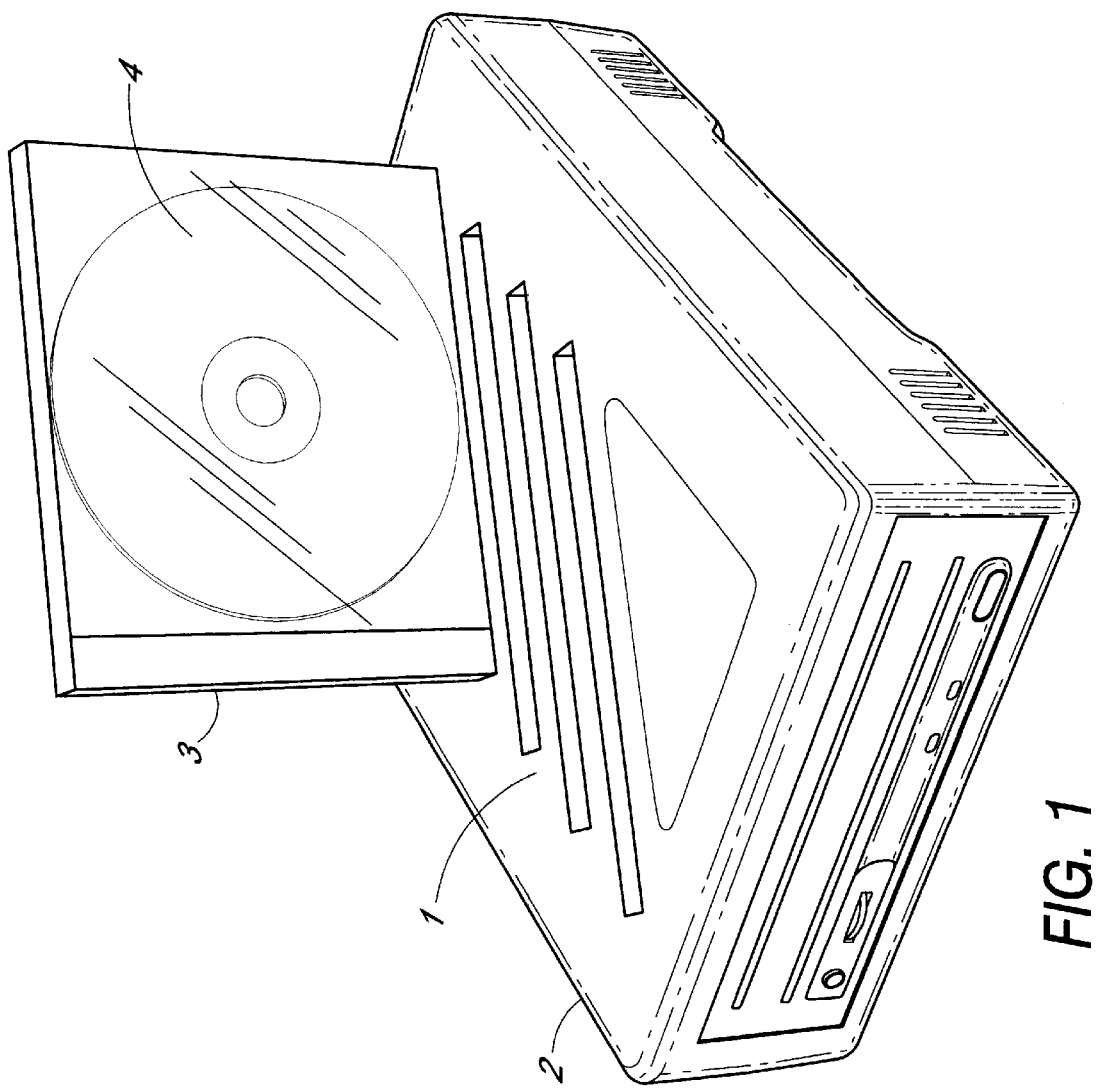
FIG. 1 is a perspective view illustrating one embodiment of the disk drive enclosure according to the present invention.

In one embodiment, the disk drive enclosure comprises a disk holder on the top panel. FIG. 1 is a schematic perspective view illustrating an embodiment of the disk drive enclosure according to the present invention. A disk holder (1) is provided as an integral part of an enclosure (2). In the disk holder, a hard case (3) including a disk (4) is held. As explained below, the disk holder can be in various shapes, and can be designed to hold a disk without a hard case or a disk with a soft case.

Figure 2A:
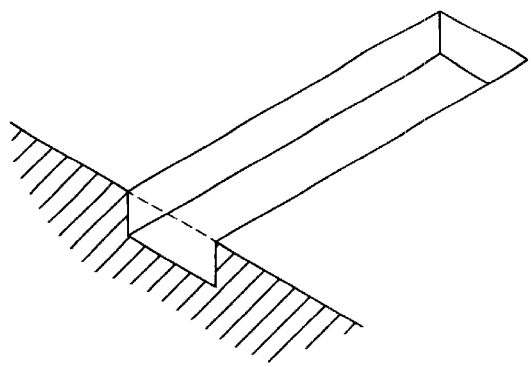
FIGS. 2A–2E are schematic perspective, cross-sectional views, indicating various structures of the disk holder.
Figure 2B:
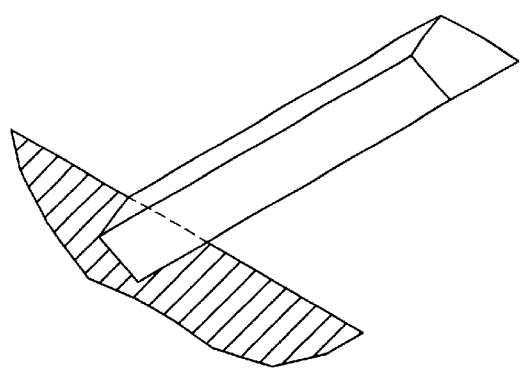
Figure 2C:
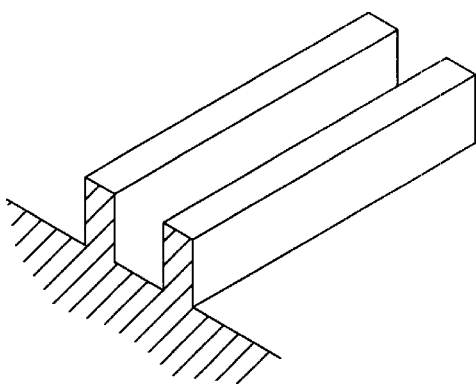
Figure 2D:
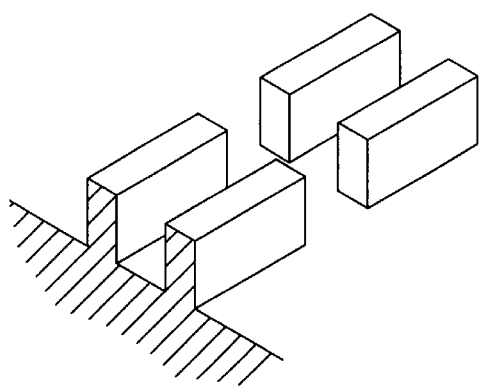
Figure 2E:
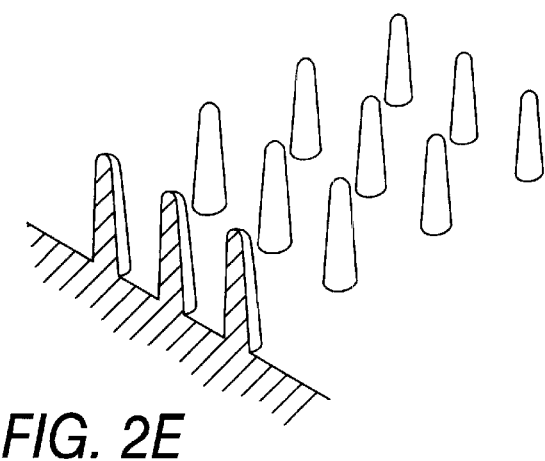

FIGS. 2A–2E are schematic perspective, cross-sectional views indicating various structures of the disk holder according to the present invention. As indicated in the figures, the disk holder can be comprised of grooves or slots (FIGS. 2A and 2B), continuous ridges (FIG. 2C), discontinuous ridges (FIG. 2D), or projections (FIG. 2E). In FIG. 2A, the sides of grooves are perpendicular to the surface of the top panel. However, as shown in FIG. 2B, the sides of grooves can be slanted with respect to the surface of the top panel. When slanted, a user of the disk drive can easily grasp the disks with fingers or can see the side of the hard case indicating the name or subtitle of the disk. The angle of the sides with respect to the surface of the top panel can be selected based on the user's preference. In one embodiment, the angle is in the range of 45°–90°. The depth of the grooves is adapted to hold a disk itself, a hard case, or a soft case. In one embodiment, the depth is in the range of 2–20 mm, in another embodiment 5–10 mm. The width and length are adapted to hold a disk itself, a hard case, or a soft case. If a disk itself is supported, the shape of the groove must be designed accordingly, for example, in one embodiment, the groove has a slit-like rounded longitudinal cross-section. The groove can alsos be square- or round-bottomed. Further, in order to protect the disk, hard case, or soft case or other storage containers, protective padding (not shown) can be provided on the sides and/or the edges. Although the disk holder is formed on the top panel, if the holder is not used, another device or enclosure can be placed on top. Thus, in one embodiment, the disk holder does not interfere with placing something on top of the disk enclosure.

In one embodiment, as long as the disk, hard case, or soft case is securely held in the disk holder, the disk holder can be of any shape. For example, FIGS. 2C and 2D show ridges, instead of grooves or slots which are used to hold the disk. When using ridges, the ridges can be discontinuous (FIG. 2D). The shape of the ridges can be selected in a manner similar to that of the grooves or slots described above.

Further, in another embodiment, simple projections can be used to hold disks and/or disk containers as shown in FIG. 2E. As many projections as necessary can be formed to hold the disk, hard case, or soft case. The projections can be aligned with a selected direction or can be formed at random. When formed at random, a disk can be held in any direction. For example, the disk can be oriented in any direction around an axis parallel to the enclosure top surface. The projections may be made of a resilient resin. The projections are especially useful for storing disks themselves without cases.

Figure 3A:
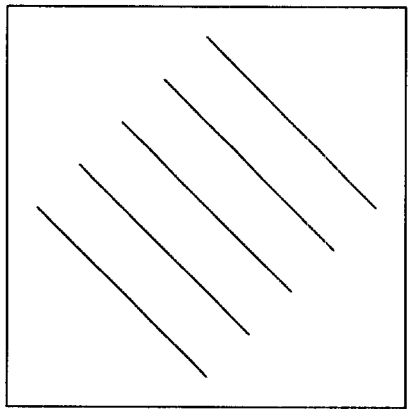
FIGS. 3A–3C are schematic plan views indicating various structures of the disk holder according the present invention.
Figure 3B:
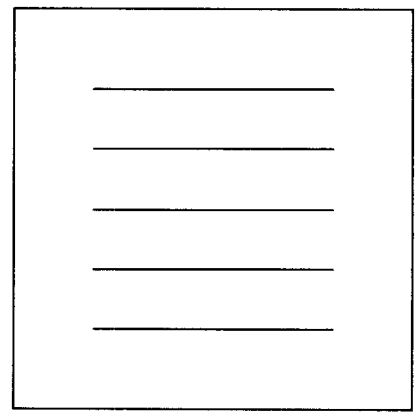
Figure 3C:
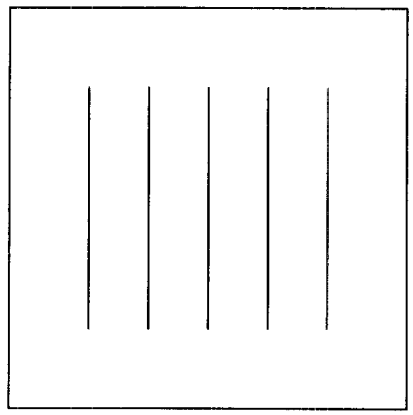

FIGS. 3A–3C are schematic plan views indicating various structures of the disk holder according to several embodiments of the present invention. The grooves, slots, ridges or projections (longitudinal sections) can be arranged along parallel lines. The number of longitudinal sections can be selected based on the user's preference. For example, 2–20 longitudinal sections are formed as an integral part of the enclosure. In another embodiment, 4–10 sections are provided. If the enclosure is large enough, more than one column can be formed on top. The direction of the longitudinal sections can be formed at an angle with respect to the front of the enclosure, as shown in FIG. 3A so that the user can easily grasp the disk. If the user is right-handed, a direction wherein the proximal end of the disk case (or disk) is directed toward the user's right is preferable since the right hand of the user can easily access the proximal end (FIG. 3A). FIG. 1 shows slots arranged in a direction which may be preferred by a user who is left-handed since the proximal end of the-disk case is directed toward the user's left. The longitudinal sections can be parallel to the front panel (FIG. 3B) or side panels (FIG. 3C). The direction can be selected based on the user's preference.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. A disk drive enclosure comprising:
   a top panel having an inside surface and an outside surface; and
   a disk holder for holding disk products, said disk holder being provided on the outside surface of the top panel as an integral part of the top panel and shaped to receive and hold at least one disk product on or above the outside surface of the top panel.

2. The disk drive enclosure as defined in claim 1, wherein the disk holder includes at least one groove which is used to receive said disk product.

3. The disk drive enclosure as defined in claim 2, wherein said at least one groove has sides perpendicular to the surface of the top panel.

4. The disk drive enclosure as defined in claim 2, wherein said at least one groove has sides slanted with respect to the surface of the top panel.

5. The disk drive enclosure as defined in claim 2, wherein said at least one groove is at least two grooves arranged along parallel lines.

6. The disk drive enclosure as defined in claim 2, wherein said at least one groove is formed in an offset direction.

7. The disk drive enclosure as defined in claim 6, wherein the offset direction is such that the proximal end of the disk product is directed toward the right of a user who is right-handed.

8. The disk drive enclosure as defined in claim 7, wherein said offset direction is such that the proximal end of the disk product is directed toward the left of a user who is left-handed.

9. The disk drive enclosure as defined in claim 6, wherein the offset direction is such that the proximal end of the disk product is directed toward the left of a user who is left-handed.

10. The disk drive enclosure as defined in claim 1, wherein the disk holder includes at least one slot which is used to receive said disk product.

11. The disk drive enclosure as defined in claim 1, wherein the disk holder includes continuous ridges which are used to receive said disk product.

12. The disk drive enclosure as defined in claim 11, wherein said ridges are arranged along parallel lines.

13. The disk drive enclosure as defined in claim 11, wherein said ridges are formed in an offset direction.

14. The disk drive enclosure as defined in claim 13, wherein said offset direction is such that the proximal end of the disk product is directed toward the right of a user who is right-handed.

15. The disk drive enclosure as defined in claim 1, wherein the disk holder includes discontinuous ridges which are used to receive said disk product.

16. The disk drive enclosure as defined in claim 15, wherein said ridges are arranged along parallel lines.

17. The disk drive enclosure as defined in claim 1, wherein the disk holder includes a plurality of projections which are used to receive said disk product, said projections extending upward from the top panel surface.

18. The disk drive enclosure as defined in claim 17, wherein said projections are aligned to hold the disk products in a direction determined by said aligned projections.

19. The disk drive enclosure as defined in claim 1, wherein the disk product is selected from the group consisting of a disk itself, a hard case thereof, and a soft case thereof.

20. The disk drive enclosure as defined in claim 1, which encloses an optical disk drive.

21. The disk drive enclosure of claim 1, wherein the disk holder comprises a plurality of shapes formed on the outside surface of the top panel for receiving and fitting thereto a side of each disk product.

22. A disk drive system comprising:
    an enclosure having at least a first surface, the first surface directed toward the outside of the enclosure and formed on the top of the enclosure;
    a disk media holder formed on said first surface as an integral part of the first surface, said disk media holder having a first sidewall and a second sidewall, said second sidewall spaced from said first sidewall to receive and hold at least one removable disk device on or above the first surface of the enclosure; and
    a disk drive mounted in said enclosure.

23. The disk drive as defined in claim 22, further comprising at least a second disk media holder formed on said first enclosure surface.

24. The disk drive as defined in claim 22, wherein said first sidewall is formed by a continuous ridge.

25. The disk drive as defined in claim 22, wherein said first sidewall is formed by a discontinuous ridge.

26. The disk drive as defined in claim 22, wherein said first sidewall is formed by a plurality of projections extending upward from said enclosure surface.

27. The disk drive as defined in claim 22, wherein said first sidewall is slanted with respect to said enclosure surface.

28. The disk drive as defined in claim 22, wherein said first sidewall is parallel to said second sidewall.

29. The disk drive as defined in claim 22, wherein said disk media device is a disk.

30. The disk drive as defined in claim 22, wherein said disk media device is a disk case.

31. The disk drive as defined in claim 22, wherein said first and second sidewalls form a slot, said slot oriented at a non-perpendicular angle with respect to the first surface of said enclosure.

32. The disk drive system of claim 22, wherein the disk media holder comprises a plurality of shapes formed on the first surface of the enclosure for receiving and fitting thereto a side of each removable disk device.

* * * * *